United States Patent Office 3,763,243
Patented Oct. 2, 1973

3,763,243
PROCESS FOR MAKING 1,4-BIS(HALOPHENOXY)-2,3-DIHALO-2-BUTENES
Gary A. Ungefug, Midland, Mich., assignor to The Dow Chemical Company, Midland, Mich.
No Drawing. Filed Oct. 29, 1970, Ser. No. 85,222
Int. Cl. C07c 43/20, 41/00
U.S. Cl. 260—613 R  2 Claims

ABSTRACT OF THE DISCLOSURE

Methyl isobutyl ketone is an excellent solvent for the preparation of 1,4-bis(halophenoxy)-2,3-dihalo-2-butene from the reaction of the corresponding phenol and 1,2,3,4-tetrahalo-2-butene in the presence of base.

BACKGROUND OF THE INVENTION

The present invention involves a reaction which is well known generically. This reaction, the Williamson synthesis, has been used primarily to prepare monoethers. In the present invention, however, specific diethers are prepared by an analogous method. Such compounds are described in my copending application, Ser. No. 69,927, filed Sept. 4, 1970.

According to the present invention, compounds having the general formula

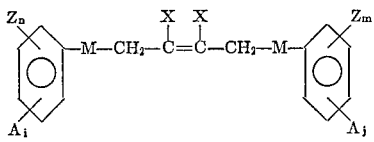

each X independently, forming either the cis or trans isomer, is F, Cl, Br, I or H where not more than one X is H,
each M independently is O or S,
each Z independently is Cl or Br,
each A independently is an inert substituent, such as F, I, methyl, phenyl, hydroxy, methoxy, nitro, carboxy, acetoxy, cyano, amino or sulfo,
$n$ and $m$ are integers of 1 to 5 provided that when $n=m=1$ then each Z and X is Br and M=O and provided that when one X is H then $n$ and $m$ are integers of 3 to 5, and
$i$ and $j$ are integers of 0 to 2 wherein $i \leq n-1$ and $j \leq m-1$ have been found to be compatible additives for polystyrene which do not discolor the polystyrene when extruded or molded at temperatures above 200° C., or even at temperatures above 220° C. Polystyrene containing these additives has been found to be fire retardant or self-extinguishing according to the Underwriters Class 2 test.

The compounds are prepared by reacting a 1,4-dihalo-2,3-substituted-2-butene with a substituted phenol or thiophenol in a two step reaction in the presence of a base, such as sodium or potassium hydroxide or carbonate. An inert solvent, such as an alcohol or ketone, is usually employed, though a solvent is not necessary. After reaction, the compounds of the invention may be isolated by any ordinary technique such as crystallization.

In the first step of the reaction, a 14-dihalo-2-butene of the general formula $$YCH_2\overset{X}{C}=\overset{X}{C}-CH_2Y$$

each Y is Cl or Br and
each X is as defined above is reacted in the presence of a base with one equivalent of a substituted benzene which has the general formula

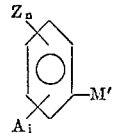

where: A, Z, $i$ and $n$ are as defined above and M'=OH or SH.

Such reaction gives as the predominant product the monosubstituted phenoxy or phenylthio 2-butene compound, although some of the 2-butene compound and disubstituted 2-butene are also present. In the second step of the reaction, an equivalent of a second phenol or thiophenol compound is reacted which has the same general formula as above except that the aromatic substituents $Z_m$ and $A_j$ replaces $Z_n$ and $A_i$. Such reaction gives as the predominant product the compound of the invention. Of course, for compounds having the identical groups on either end, i.e., where M=M, $Z_n=Z_m$ and $A_i=A_j$, two moles of the substituted benzene per mole of the 2-butene would be reacted in a single step.

Representative examples of various compounds covered by the generic structure above include essentially three parts: the first phenoxy or phenylthio end, the substituted 2-butenylene radical in the middle and the second phenoxy or phenylthio end. Both the first and second phenoxy or phenylthio parts of the molecule can be selected from the same class so only two designations are necessary: one for the two substituted benzene radicals and the other for the 2-butenylene radical. Since the substituents on the aromatic portions may be in any position without materially affecting the fire retardancy, in the designation of the compounds, the numerical position will not be given because the substituents may be arranged in any manner on the five available positions. Reference numbers will be given for these substituted benzene radicals so that they may be easily combined to show specific examples of compounds covered by the generic formula. Representative examples of such radicals include: brominated phenoxy radicals, such as (1) bromophenoxy, (2) dibromophenoxy, (3) tribromophenoxy, (4) tetrabromophenoxy, (5) pentabromophenoxy, (6) dibromomethylphenoxy, (7) tribromodimethylphenoxy, (8) tetrabromophenylphenoxy, (9) fluorodibromophenoxy, (10) diiodotribromophenoxy, (11) hydroxytribromophenoxy, (12) methoxytetrabromophenoxy, (13) nitrodibromophenoxy, (14) dinitrotribromophenoxy, (15) carboxydibromophenoxy, (16) cyanotribromophenoxy, (17) aminotetrabromophenoxy, and (18) sulfotetrabromophenoxy; the brominated phenylthio radicals, such as those corresponding to the phenoxy radicals above where the oxy linkage is replaced by the thio linkage, such radicals being designated by the number of the bromophenoxy radical prime, i.e., N'; the chlorinated phenoxy radicals, such as those representative radicals for the bromine compounds except that all bromines are replaced by chlorines, such radicals being designated by the number of the bromophenoxy radical double prime, i.e., N''; the chlorinated phenylthio radicals, such as those of the bromophenoxy radicals above where the oxy linkage is replaced by a thio linkage and all bromines are replaced by chlorines, such radicals being represented by the number of the phenoxybromo radical triple prime, i.e., N'''; mixed chlorobromophenoxy radicals, such as (19) chlorobromophenoxy, (20) chlorodibromophenoxy, (21) dichlorotribromophenoxy, (22) chlorotribromomethylphenoxy, (23) trichlorobromophenoxy, (24) nitrochlorotribromophenoxy and (25) aminochlorodibromophenoxy; and the mixed chlorobromophenylthio radicals, such as those represented by numbers 19–25 where the oxy is replaced with thio, such radicals being designated by the number prime, i.e., N'.

The second radical to be exemplified, the 2-butenylene radical, only differs in the 2,3-substitution. The substituents in the 2 and 3 position, using alphabetical designation for each pair are: (a) Br, Br; (b) Br, H; (c) Br, Cl; (d) Br, F; (e) Br, I; (f) F, F; (g) F, Cl; (h) F, I; (i) F, H; (j) Cl, Cl; (k) Cl, I; (l) Cl, H; (m) I, I and (n) I, H.

Combining the phenoxy and phenylthio radicals with the 2-butenylene radicals by number and letter designation representative compounds exemplifying the general formula of the invention are: those having symmetrical end radicals, such as 1(a)1 which denotes 1,4-bis(bromophenoxy)-2,3-dibromo - 2 - butene; 2'(c)2'; 3''(b)3''; 4'''(d)4'''; 5(e)5; 20(f)20; 6'(g)6'; 7''(h)7''; 8'''(i)8'''; 9(j)9; 10'(k)10'; 11''(l)11''; 12'''(h)12'''; 13(m)13; 14(a)14; 15'(c)15'; 16''(b)16''; 17'''(d)17'''; 18(e)18; 19'(f)19'; 21(g)21; 22'(h)22'; 23(j)23; 24'(i)24' and 25(k)25; and those having unsymmetrical radicals such 1(m)25 which denotes 1-bromophenoxy-4-aminochlorobromophenoxy - 2,3 - diiodo-2-butene; 3''(n)24'; 3'''(l)23; 4'''(k)22'; 5(j)21; 7'(i)20'; 6(h)19; 8'(g)18'''; 9(f)17'; 10(e)16''; 1(d)15'''; 12(c)14''; and 12(a)13'''. All these compounds designated represent suitable fire retardant compounds. In the same manner as shown above, other combinations of these numbers can be chosen, and the resulting compound is examined in the light of the general formula to determine whether the compound is covered by the invention. All such compounds that meet the criteria of the general formula are desirable fire retardants and can be prepared by the method described above.

The compounds produced by such reaction may be any of the compounds of the general formula above. Preferred compounds are those where M is oxygen. Also preferred are compounds wherein at least one and preferably both X are Br and those compounds containing aromatic bromine, i.e., where Z is Br because of their effective fire retardant characteristics. Highly desirable are compounds where $n=3$ to 5. Compounds of the general formula containing about 6 to about 10 bromine atoms are also preferred because of their special effectiveness, and of special interest because of effectiveness and ease of preparation are 1,4-bis(tribromophenoxy)-2,3-dibromo-2-butene, i.e., wherein each X and each Z is Br, $n=m=3$, $i=j=0$ and M=oxygen; 1-(tribromophenoxy)-4-pentabromophenoxy(-2,3-dibromo-2-butene, i.e., where each X and Z is Br, $n=3$, $m=5$, $i=j=0$ and $m$=oxygen; 1,4-bis-[dibromonitrophenoxy]-2,3-dibromo-2-butene, i.e., where each X and Z is Br, $m=n=2$, each $A=NO_2$, $i=j=1$ and M=oxygen; and 1,4-bis[dimethyltribromophenoxy]-2,3-dibromo-2-butene, i.e., where each X and Z is Br, $m=n=3$, and each A is methyl. From the economic view point, compounds containing symmetrical aromatic groups are preferred, i.e., where each M is the same, each $Z_n=$ each $Z_m$ and each $A_i$=each $A_j$.

To a 2-liter three-necked flask equipped with a mechanical stirrer, condenser and ascarite drying tube, 1 liter of ethanol and 13.4 grams of 85% potassium hydroxide pellets were charged. When the base had been dissolved, 72 grams of 2,4,6-tribromophenol was added and dissolved. To this mixture 40 grams of trans-1,2,3,4-tetrabromo-2-butene was added along with an additional 500 ml. of ethanol. The mixture was heated at reflux with stirring for 30 hours, cooled and poured over an equal volume of ice with stirring. The resulting slurry was made basic with 2 N potassium hydroxide and the solid was collected by suction filtration. The crude product was washed 3 times with water and dried in vacuum at 80° C. The dried solid was crystallized once from 2.5 liters of o-dichlorobenzene to give 76.4 grams (81.5%) of 1,4-bis(2,4,6-tribromophenoxy)-2,3-dibromo-2-butene which has a melting point of 254° to 256° C. with decomposition.

*Elemental analysis.*—Calcd. for $C_{16}H_8Br_8O_2$ (percent): C, 22.05; H, 0.93; Br, 73.36. Found (percent): C, 22.03; H, 0.98; Br, 74.0.

The generic reaction in its specific applications has been conducted in a number of solvents. Some of the solvents employed include alcohols, water and acetone, see for example Hickinbottom, Reactions of Organic Compounds, Longmans, Green and Company, New York (1938) beginning at page 71. The use of alcohols which correspond to one of the portions of the ether is apparently preferred because the production of undesirable by-products is minimized.

In confronting a particular reaction, the solvent which gives the best results cannot be predicted. Even though broad classes of solvents are known for this reaction, the particular class or the particular solvent best suited to the reaction cannot be predicted.

SUMMARY OF THE INVENTION

It has now been found according to the present invention that methyl isobutyl ketone is an excellent solvent for the preparation of 1,4-bis(halophenoxy)-2,3-dihalo-2-butenes by reacting the corresponding phenate and 1,2,3,4-tetrahalo-2-butene. By the use of this solvent, short reaction times, high yields and product of very desirable purity are obtained.

The important and novel aspect of the present invention is the use of methyl isobutyl ketone as the solvent in the specific preparation of a particular diether.

The proportions of the solvent in the reaction mixture, of course, may vary widely. Generally, about 0.5 to about 20 or more volumes of solvent based on the volume of the reactants are employed.

The methyl isobutyl ketone may be used alone or in combination with other solvents. Suitable co-solvents include water, chlorinated hydrocarbons, other ketones, N,N-dimethylformamide, alcohols and the like. Such co-solvents may be employed in the invention, however, only to the extent that they do not exceed about 50% by volume of the total solvent, and preferably not more than about 15%. Thus, the solvent of the invention must contain at least a major amount of methyl isobutyl ketone, with those solvents containing more than about 85% by volume of methyl isobutyl ketone being preferred and those solvents consisting essentially of methyl isobutyl ketone being of particular importance because of the high yields of desirable purity.

The specific reaction of the invention involves the contact of halogenated phenols which may also contain other inert substituents with a tetrahalo-2-butene in the presence of base, preferably sodium carbonate, under suitable conditions to cause the reactants to form the 1,4-bis(halophenoxy)-2,3-dihalo-2-butene. These reaction conditions are known and are not the subject of the present invention. Of primary importance, however, in the present invention is the preparation of 1,4-bis(2,4,6-tribromophenoxy)-2,3-dibromo-2-butene.

SPECIFIC EMBODIMENTS

Example 1

To a reactor was charged 500 ml. of methyl isobutyl ketone, 78 g. (0.24 mole) of 2,4,6-tribromophenol and 18.4 g. of 50% sodium hydroxide in water. The reactor mass was heated to reflux, 42.3 g. of 1,2,3,4-tetrabromo-2-butene in 49 g. of chlorobenzene was added and the mixture was refluxed for 2.25 hours. The water and 125 ml. of the solvent were distilled from the reaction mixture and the mixture was refluxed for 1.5 hours. The reactor mass was cooled to 35° C., the solid product was collected by filtration and separately washed with methyl isobutyl ketone, acetone and then water. The product was dried to give 90 g. of an off-white solid having a melting point of 253.5°–254° C. with decomposition. This corresponds to 1,4-bis(2,4,6-tribromophenoxy)-2,3-dibromo-2-butene which has a M.P. of 255° C. The yield was 90% of the theoretical.

Example 2

A mixture of 12.5 g. (0.12 mole) of sodium carbonate, 38 g. (0.06 mole) of 2,4,6-tribromophenol and 350 ml. of methyl isobutyl ketone was heated at reflux with stirring for 4 hours. The mixture was cooled to room temperature, and the solid was separated by filtration and washed with 150 ml. of methyl isobutyl ketone. The solid was washed four times with 150 ml. of hot water and dried under vacuum at 100° C. to give 45.2 g. of a white powder having a melting point of 255° C. corresponding to that of 1,4-bis(2,4,6-tribromophenoxy)-2,3-dibromo-2-butene.

The methyl isobutyl ketone reaction solvent and methyl isobutyl ketone wash was combined and recycled for use in subsequent reactions which were substantially the same as that above. Methyl isobutyl ketone used in four reactions without purification gave an average product yield of 97.2% based on the tribromophenol, and the product was analyzed to have a purity of 99.0 to 99.9%. Only slight discoloration of the solvent was observed at the end of the four reactions.

In the same manner as shown by the examples above, 0.5 to 20 volumes of methyl isobutyl ketone may be used in the reaction of a halogenated phenol and tetrahalo-2-butene in the presence of base to advantageously prepare any of the 1,4-bis(halophenoxy)-2,3-dihalo-2-butenes described in my copending application, Ser. No. 69,927, filed Sept. 4, 1970.

I claim:
1. In the process for preparing 1,4-bis(halophenoxy)-2,3-dihalo-2-butenes by contacting (a) a halophenol selected from the group consisting of bromophenols and chlorophenols, having 1 to 5 halogens, (b) a 1,2,3,4-tetrahalo-2-butene wherein the halo moiety is chlorine or bromine and (c) a base selected from the group consisting of sodium hydroxide, potassium hydroxide and sodium carbonate, the improvement comprising conducting the reaction in the presence of a solvent consisting essentially of methyl isobutyl ketone.
2. The process of claim 1 wherein the halophenol is 2,4,6-tribromophenol and the 1,2,3,4-tetrahalo-2-butene is 1,2,3,4-tetrabromo-2-butene.

References Cited

UNITED STATES PATENTS

| | | | |
|---|---|---|---|
| 2,488,500 | 11/1949 | Moyle | 260—613 R |
| 2,488,501 | 11/1949 | Moyle | 260—613 R |

OTHER REFERENCES

Hickinbottom, Reactions of Organic Compounds (1948), pp. 90–93.

BERNARD HELFIN, Primary Examiner

U.S. Cl. X.R.

260—520, 479 R, 465 F, 465 G, 465 H, 465 K, 571, 512 C